(12) United States Patent
Innanje et al.

(10) Patent No.: US 12,141,420 B2
(45) Date of Patent: Nov. 12, 2024

(54) CLICK BASED CONTOUR EDITING

(71) Applicant: Shanghai United Imaging Intelligence Co., LTD., Shanghai (CN)

(72) Inventors: Arun Innanje, Cambridge, MA (US); Zheng Peng, Cambridge, MA (US); Ziyan Wu, Cambridge, MA (US); Qin Liu, Cambridge, MA (US); Terrence Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 89 days.

(21) Appl. No.: 17/960,367

(22) Filed: Oct. 5, 2022

(65) Prior Publication Data
US 2024/0118796 A1    Apr. 11, 2024

(51) Int. Cl.
*G06T 7/12*      (2017.01)
*G06F 3/04842*   (2022.01)
*G06T 11/00*     (2006.01)

(52) U.S. Cl.
CPC ............ *G06F 3/04842* (2013.01); *G06T 7/12* (2017.01); *G06T 11/00* (2013.01); *G06T 2200/24* (2013.01); *G06T 2210/12* (2013.01); *G06T 2210/22* (2013.01)

(58) Field of Classification Search
None
See application file for complete search history.

(56) References Cited

U.S. PATENT DOCUMENTS

| | | | |
|---|---|---|---|
| 8,351,670 B2 | 1/2013 | Ijiri et al. | |
| 2004/0056898 A1* | 3/2004 | Jetha | G06F 3/04812 |
| | | | 715/781 |
| 2004/0197015 A1* | 10/2004 | Fan | G06V 10/443 |
| | | | 382/128 |
| 2005/0123197 A1 | 6/2005 | Tank | |
| 2006/0274928 A1* | 12/2006 | Collins | G16H 30/40 |
| | | | 382/132 |
| 2016/0171709 A1* | 6/2016 | Kim | G06T 7/12 |
| | | | 382/175 |
| 2019/0114062 A1* | 4/2019 | Niemantsverdriet | H05B 47/19 |
| 2021/0236091 A1* | 8/2021 | Tsuruta | A61B 8/469 |
| 2021/0278958 A1* | 9/2021 | Dubey | G06F 3/0481 |

FOREIGN PATENT DOCUMENTS

| | | |
|---|---|---|
| DE | 10357206 A1 | 7/2005 |
| WO | 2007069141 A1 | 6/2007 |

\* cited by examiner

*Primary Examiner* — Sultana M Zalalee
(74) *Attorney, Agent, or Firm* — Zhong Law, LLC (57) ABSTRACT

Click based contour editing includes detecting a selection input with respect to an image presented on a graphical user interface; designating an area of the image corresponding to the selection input as a region of interest; detecting at least one other selection input on the graphical user interface with respect to the image; determining if the at least one other selection input is within the region of interest or outside of the region of interest; and if the at least one other selection input is within the region of interest, excluding the portion of the image corresponding to the other input; or if the other selection input is outside of the region of interest, including the portion of the image corresponding to an area of the image associated with the other selection input.

18 Claims, 6 Drawing Sheets

CLICK BASED CONTOUR EDITING

FIELD

The aspects of the disclosed embodiments relate generally to the field of image processing, and more specifically, to click seedpoint based contour editing.

BACKGROUND

Contour editing workflows typically involves a semiautomatic or fully automated initial segmentation and subsequent contour extraction. However, most of these techniques have limitations when capturing the fine boundaries or certain parts of the region of interest.

In certain contour editing applications interactive tools for editing the contour are provided. Typically, the tools include user interface (UI) based interactive tools that allow a user to edit part of the contour, where in the user selected control point is used to adjust the nearby region of the contour either by adding or removing points. The region of contour adjusted could be smoothened using for example a Bezier function. In order to further smoothen the curve, interpolation techniques are applied. In many cases the control points are predefined on the polygon and the editing is constrained between the two consecutive control point.

However, these processes to interact with the polygon and make fine adjustments to get an acceptable contour are time consuming. It would be advantageous to be able to provide a novel simplified workflow that allows user to use intuitive few clicks for initial estimation and adjusting contour.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

The aspects of the disclosed embodiments are generally directed to methods, systems and/or computer program products to implement click based contour editing, substantially as shown in and/or described in connection with at least one of the figures, as set forth more completely in the claims.

According to a first aspect, the disclosed embodiments are directed to a click based contour editing method. In one embodiment, the method includes detecting a selection input with respect to an image presented on a graphical user interface; designating an area of the image corresponding to the selection input as a region of interest; detecting at least one other selection input on the graphical user interface with respect to the image; determining if the at least one other selection input is within the region of interest or outside of the region of interest; and (1) if the at least one other selection input is within the region of interest, remove at least a portion of the image corresponding to an area of the image associated with the at least one other input; or (2) if the at least one other selection input is outside of the region of interest, expand the region of interest to include at least a portion of the image corresponding to an area of the image associated with the at least one other selection input. The aspects of the disclosed embodiments provide a click based contour editing method that does not require the calculation of any curves and uses semi-automated segmentation, where the user can adjust the contour with few simple clicks.

In a possible implementation form, the method further includes presenting a bounding box surrounding the region of interest on the graphical user interface.

In a possible implementation form, the method further includes detecting a selection of the portion of the image corresponding to an area of the image associated with the at least one other selection input that is included within the expanded region of interest; detecting a movement of the selection on the graphical user interface; and repositioning the selected portion of the image corresponding to an area of the image associated with the at least one other selection input within the expanded region of interest.

In a possible implementation form, the at least one other selection input is a selection of a point in the image, the point being associated with a visibly distinguishable region of the image.

In a possible implementation form, a detected selection of a point outside the region of interest results in an inclusion of an associated visibly distinguishable region around the point inside the region of interest.

In a possible implementation form, a dimension of the bounding box is increased to include the associated visibly distinguishable region around outside of the region of interest and define a new region of interest.

In a possible implementation form, a detected selection of a point inside the region of interest results in an exclusion of an associated visibly distinguishable region around the point from the region of interest.

In a possible implementation form, a dimension of the bounding box is decreased to exclude the associated visibly distinguishable region around the point from the region of interest and define a new region of interest.

In a possible implementation form, the detected selection input is one or more of a touch input, a click input, a click, a drag input or a text input.

In a possible implementation form, the region of interest has on of a circular shape, an elliptical shape, a rectangular shape, a polygonal shape, a freeform shape, a spherical shape, an ellipsoid, a cuboidal shape, a polygonal prism shape, a polygonal pyramid shape, a freeform prism shape, or a freeform pyramid shape.

According to a second aspect, the disclosed embodiments are directed to a system comprising a hardware processor communicatively coupled to a graphical user interface, wherein the hardware processor is configured to detect a selection input with respect to an image presented on a graphical user interface; designate an area of the image corresponding to the selection input as a region of interest; detect at least one other selection input on the graphical user interface with respect to the image; determine if the at least one other selection input is within the region of interest or outside of the region of interest; and (1) if the at least one other selection input is within the region of interest, remove at least a portion of the image corresponding to an area of the image associated with the at least one other input; or (2) if the at least one other selection input is outside of the region of interest, expand the region of interest to include at least a portion of the image corresponding to an area of the image associated with the at least one other selection input.

In a possible implementation form the hardware processor is further configured to present bounding box surrounding the region of interest on the graphical user interface.

In a possible implementation form the hardware processor is further configured to: detect a selection of the portion of the image corresponding to an area of the image associated with the at least one other selection input that is included within the expanded region of interest; detect a movement of the selection on the graphical user interface; and reposition the selected portion of the image corresponding to an area of the image associated with the at least one other selection input within the expanded region of interest.

In a possible implementation form the at least one other selection input is a selection of a point in the image, the point being associated with a visibly distinguishable region of the image.

In a possible implementation form a detected selection of a point outside the region of interest results in an inclusion of an associated visibly distinguishable region around the point inside the region of interest.

In a possible implementation form a dimension of the bounding box is increased to include the associated visibly distinguishable region around outside of the region of interest and define a new region of interest.

In a possible implementation form a detected selection of a point inside the region of interest results in an exclusion of an associated visibly distinguishable region around the point from the region of interest.

In a possible implementation form a dimension of the bounding box is decreased to exclude the associated visibly distinguishable region around the point from the region of interest and define a new region of interest.

In a possible implementation form the detected selection input is one or more of a touch input, a click input, a click, a drag input or a text input.

In a possible implementation form the region of interest has one of a circular shape, an elliptical shape, a rectangular shape, a polygonal shape, a freeform shape, a spherical shape, an ellipsoid, a cuboidal shape, a polygonal prism shape, a polygonal pyramid shape, a freeform prism shape, or a freeform pyramid shape.

According to a third aspect, the disclosed embodiments are directed to a computer program product. In one embodiment, the computer program product, which can be embodied on a computer readable medium, includes non-transitory computer-readable program instructions, which when executed by a hardware processor of a computing device, are configured to cause the computing device to implement and perform one or more of the possible implementation forms described herein.

These and other advantages, aspects, and novel features of the present disclosure, as well as details of an illustrated embodiment thereof, will be more fully understood from the following description and drawings.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

The following detailed description illustrates exemplary aspects of the disclosed embodiments and ways in which they can be implemented. Although some modes of carrying out the aspects of the disclosed embodiments have been disclosed, those skilled in the art would recognize that other embodiments for carrying out or practising the aspects of the disclosed embodiments are also possible.

Figure 1:
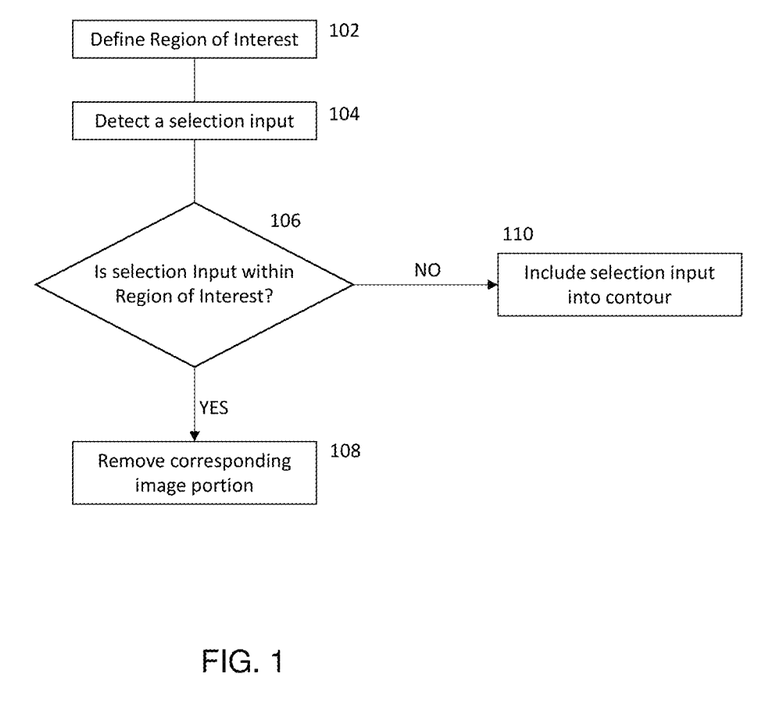
FIG. 1 is a flowchart that illustrates an exemplary click based seedpoint contour editing method in accordance with an embodiment of the present disclosure.

Referring to FIG. 1, the aspects of the disclosed embodiments are generally directed to click based seedpoint contour editing. In one embodiment, the method includes detecting a selection input with respect to an image presented on a graphical user interface; designating an area of the image corresponding to the selection input as a region of interest; detecting at least one other selection input on the graphical user interface with respect to the image; determining if the at least one other selection input is within the region of interest or outside of the region of interest; and (1) if the at least one other selection input is within the region of interest, remove at least a portion of the image corresponding to an area of the image associated with the at least one other input; or (2) if the at least one other selection input is outside of the region of interest, expand the region of interest to include at least a portion of the image corresponding to an area of the image associated with the at least one other selection input. The click base seedpoint contour editing method of the disclosed embodiments enables contour editing without the need for calculation of curves and uses semi-automated segmentation where the user can adjust the contour with a few simple clicks.

In one embodiment, referring to the flowchart of FIG. 1, a first step involves identifying 102 a region of interest in an image. For the purposes of the description herein, the image refers to a image created using imaging technology, such as magnetic resonance imaging (MRI). In alternate embodiments, the imaging technology can including any suitable imaging technology that is susceptible to contour editing, such as segmentation and contour extraction. Examples of such imaging technology can include, but is not limited to, Computed Tomography (CT) exam, a fluoroscopy exam, a radiography exam, an ultrasound exam, or a PET scan.

Figure 2:
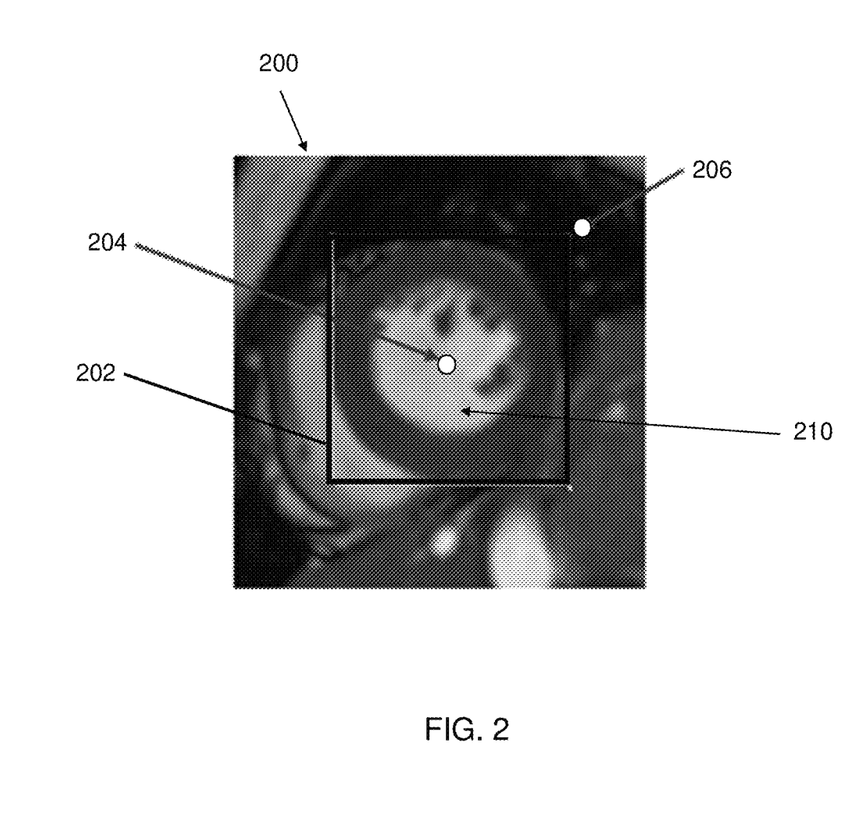
FIGS. 2-4 are exemplary images of illustrating aspects of the disclosed embodiments.

In one embodiment identifying 102 a region of interest can include creating or drawing a bounding box around the area of interest. This results in a contour around the region of interest. One example of an exemplary bounding box 202 is illustrated in FIG. 2. Although a bounding box is generally referred to herein, the aspects of the disclosed embodiments are not so limited. In alternate embodiments, any suitable manner of identifying a region of interest in or on an image can be utilized, other than including a bounding box.

The area of interest that is used to identify the region of interest can be defined or selected in any suitable manner. For example, in one embodiment, a user selects a point or region in the image. A certain area around the selected point can be defined as the area of interest. The area can be any defined region or area.

In one embodiment, the user can also mark an area of interest. This can include highlight an area on the image by touching a certain area, selecting a number of points around an area or even outlining a area. When selecting a number of points, in one embodiment, lines can be used to connect the points.

The contour that is used to define the area of interest can have any suitable shape. The shape can be regular or irregular, and comprise any suitable two dimensional or three dimensional geometric shape or image.

Once a contour around a region of interest is defined 102, which will also be referred to as the initial segmented region herein, the user can add or select points within or outside the initial segmented region. In the example of FIG. 2, the initial segmented region 210 is the area within the confines or perimeter of the bounding box 202.

In one embodiment, the method 100 further includes detecting 104 a selection of another point on the image after the initial or current contour is defined. The detection of the selection of a point outside the current contour will result in inclusion of a visibly distinguishable region around the newly selected point into the contour. The detection of the selection of a point inside the current contour will result in exclusion of a visibly distinguishable region around the selected point from the current contour.

This single click process of the disclosed embodiments reduces the number of clicks required for extracting the final contour from the data. This is particularly intuitive when segmenting using touch screen devices, where the user only has to touch, or make near contact with, the point of interest on the screen to add and remove parts of the contour.

Once it is detected 104 that another point on the image has been selected, in one embodiment, it is determined 106 whether the newly selected point lies within or outside of the initial or current contour. If the newly selected point is within the contour, an area or portion of the image around the selected point, also referred to herein as a visibly distinguishable region, is removed 108 or otherwise deleted from the image.

If it is determined 106 that the newly selected point is outside of the current contour, the newly selected point, or visibly distinguishable region around the newly added point, is included 110 into the contour. In one embodiment, this can include expanding or enlarging the current contour. When using a touch screen device, the user just has to touch the point of interest on the screen to add parts to the contour.

For example, referring again to FIG. 2, the contour around the region of interest 210 in the image 200 is shown by the bounding box 202. For purposes of the description, a point 204 is highlighted that is within the region of interest 210. Another point 206 in FIG. 2 is highlighted for purposes of this explanation, to illustrate a point outside of the region of interest 210.

Figure 3:
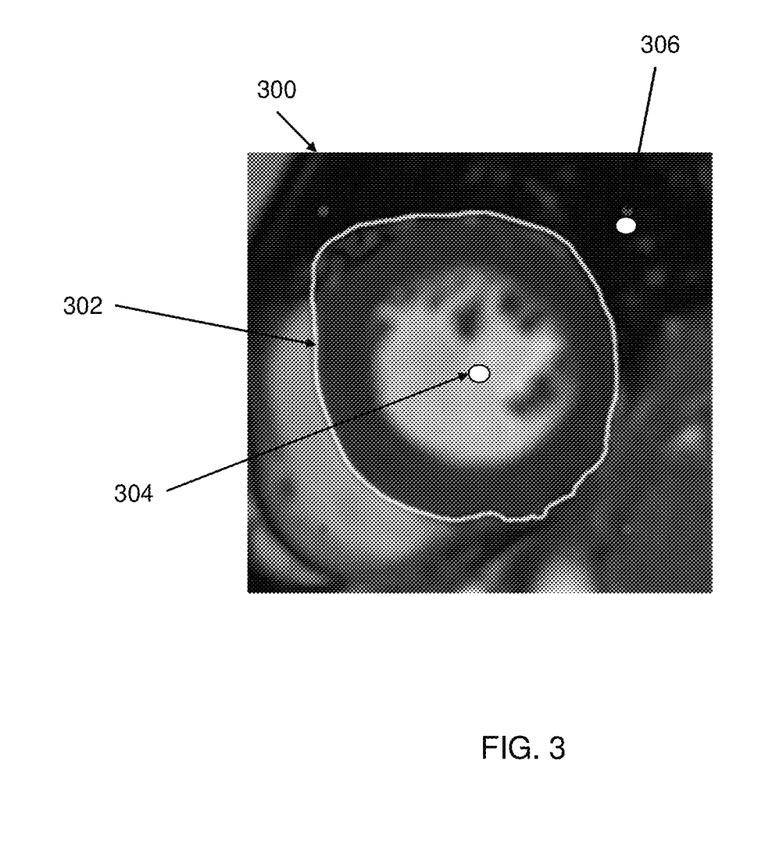
Figure 4:
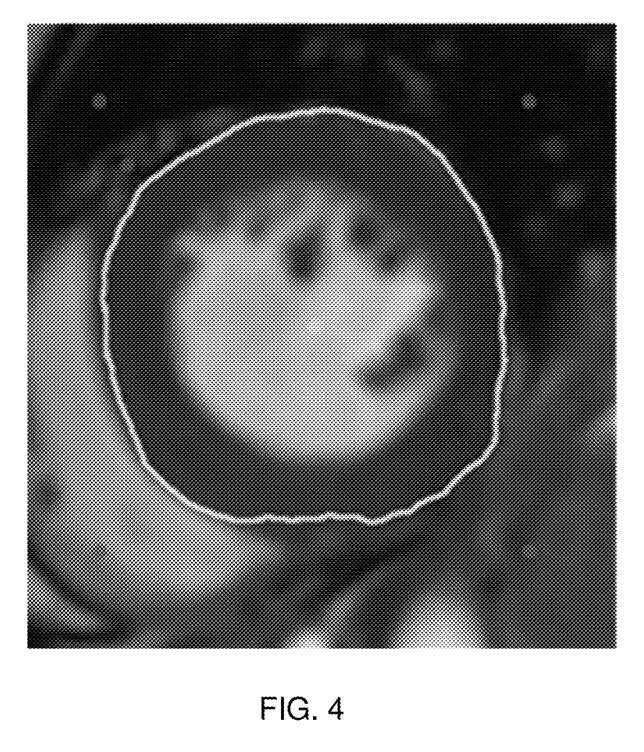

FIGS. 3 and 4 illustrate the inclusion of a visibly distinguishable region and the exclusion of a visibly distinguishable region. In the image of FIG. 3, the contour 302 has a non-uniform shape. Examples of a point 304 with the contour 302 and a point 306 outside the contour 302 are illustrated.

Figure 5A:
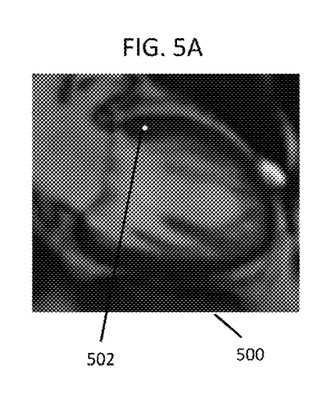
FIGS. 5A-5E illustrate exemplary images illustrating sequence flows incorporating aspects of the disclosed embodiments.

FIG. 5A illustrates an exemplary image 500 in which a point of interest 502 is identified. In one embodiment, the point of interest 502 is a user selected control point. The user selected control point can be used to adjust the nearby region of the contour either by adding or removing points.

Figure 5B:
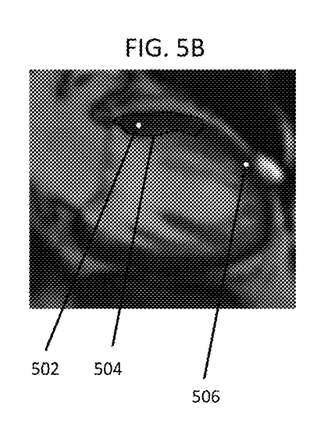

In FIG. 5B, a bounding box or contour around this initial region of interest 504 highlights the point of interest 502. The bounding box can be any suitable shape, size and area to include the control point(s). The bounding box in these examples can be formed or drawn around the selected or desired control point(s), or point(s) of interest. In one embodiment, the bounding box is highlighted in some form, such as by color, to visibly distinguish it from the image and control points.

As is also shown in FIG. 5B, another point of interest 506 is identified and selected in a suitable manner. The point 506 is outside of the current region of interest 504. Thus, the selection of point 506 will cause it to be included with a new region of interest, that is formed or drawn by a bounding box, the includes the selected point 506. In some embodiments, a point inside the region of interest 504, such as point 502 can be one color, and the point 506 outside of the region of interest 504 can be a different color, to highlight the different locations.

Figure 5C:
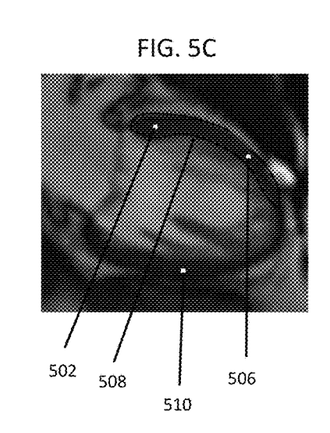

In FIG. 5C, since the point 506 outside of the region of interest 504 in FIG. 5B is selected, the initial region of interest 504 of FIG. 5C is expanded to include the point 506. This new region of interest 508 now includes both points 502 and 506.

Figure 5D:
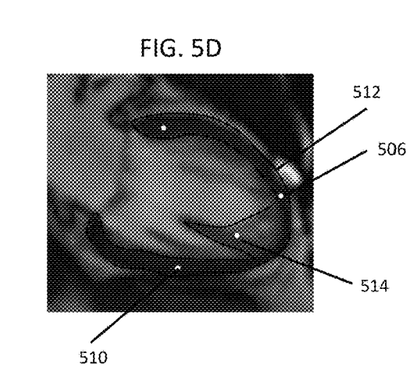

In FIG. 5D, the point 510, outside of the region of interest 508 shown in FIG. 5C, is selected. This causes the region of interest 508 of FIG. 5C to expand to form a new region of interest 512 that includes point 510.

Figure 5E:
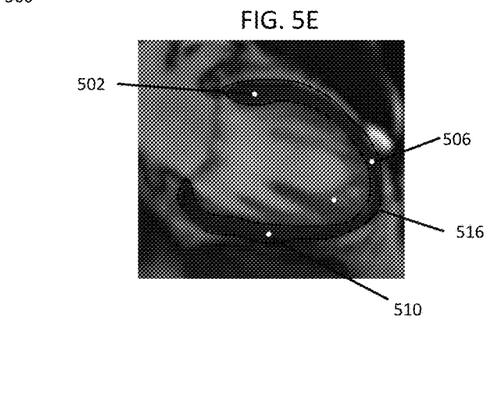

FIG. 5E illustrates the removal of a point from a region of interest. In the example of FIG. 5D, point 514 is within the contour of the region of interest 512. As described herein, the point 514 can be selected to be removed from the region of interest 512. When point 514 is selected to be removed or deleted, as is shown in FIG. 5E, a new region of interest 516 is formed or highlighted. This region of interest 516 does not include the point 514.

For example, a cardiac contour editing workflow with at least one image or volume allows user to create or draw a simple bounding box around the area of interest. This results in a segmented region within the bounding. Generally, the entirety of the most significant part of the region of interest might be included within the bounding box. The aspects of the disclosed embodiments allows subsequent interaction with a graphical user interface, or other display that is presenting the image, to add and remove parts of the image into the extracted contour using point clicks. Clicking on or otherwise selecting a point outside the current contour will result in inclusion of the visibly distinguishable region around the newly selected point into the contour. Clicking on or otherwise selecting a point inside the current contour will result in exclusion of the visibly distinguishable region around the newly added point from contour.

In one embodiment, the user can start the segmentation using a single click instead of bounding box. In this case the newly selected point is considered to be inside the region of interest.

In one embodiment, the display or graphical user interface can be configured to support user interface devices like a mouse or touch screen device. In this implementation, a left or right click of the mouse, or a finger touch of touch screen system, can be used to select new points, in order to include or exclude visibly distinguishable regions around the selected new points.

In one embodiment, the user to move selected points that are included within the region of interest or bounding box as is described herein. Moving the points can accommodate fine adjustment using the same input device, with manipulations such as left click, right click, drag or touch hold drag.

The aspects of the disclosed embodiments also allow the user to adjust the contour or bounding box. For example, the user can manipulate the contour for fine adjustment. Where the contour is a contour polygon, the surface of the polygon can be moved for the fine adjustment. In one embodiment, the contour or bounding box is a two dimensional or three dimensional bounding box, which can be the initial seed point input.

Figure 6:
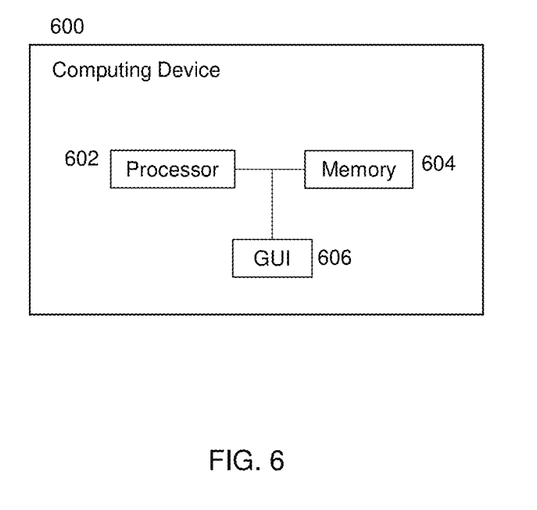
FIG. 6 is a schematic block diagram of an exemplary apparatus that can be used to implement the aspects of the disclosed embodiments.

FIG. 6 illustrates an exemplary apparatus 600 that can be used to implement aspects of the embodiments disclosed herein. As shown in FIG. 6, the apparatus 600 can generally comprise a computing apparatus or device. The apparatus 600 can include one or more of a processor 602, memory 604 and graphical user interface 606.

The term "processor" as is generally referred to herein, relates to a computational element that is operable to respond to and process instructions. The at least one processor, in operation, implements the aspects of the embodiments disclosed herein. Furthermore, the term "processor" may refer to one or more individual processors, processing devices and various elements associated with the processing device that may be shared by other processing devise. Such processors, processing devices and elements may be arranged in various architectures for responding to and executing steps of the method.

In one embodiment, the image can be received from a data repository using the processor, wherein the data repository is communicably coupled to the processor. The data repository can be used to pre-store the image digitally for using the image at a later time. The term "data repository" refers to hardware, software, firmware, or a combination of these for storing the at least one image. It will be appreciated that the data repository could be implemented as a cloud-based memory, a memory of the at least one server, a memory of the computing device, a local memory of a user device, a removable memory, or similar. Optionally, the at least one image can be received from the medical imaging device, wherein the medical imaging device comprises at least one camera for capturing at least one image of the at least one organ. Herein, the at least one camera can be either at a fixed pose, or different poses. Optionally, the at least one image captured by the medical imaging device is stored in the data repository, and retrieved from the data repository whenever required.

In accordance with an embodiment, a given selection input is provided using a selection input device (not shown). In one embodiment, the selection input device can be embodied in or otherwise connected to the graphical user interface 706, as will be generally understood. In one embodiment, the selection input can be one or more of a touch input, a click input, a click and drag input, or a text input. The term "user input device" or "selection input device" generally refers to an electronic device that is capable of at least providing the selection input and/or movement. The selection input device is associated with (or used by) a user and is configured to enable the user to perform specific tasks associated with the embodiments disclosed herein. Examples of the selection device include, but are not limited to, a mouse, a touch pad, a key board, a key pad, and a joystick.

The aspects of the disclosed embodiments also relate to the system as described above. Various embodiments and variants disclosed above apply mutatis mutandis to the system.

Further, many embodiments are described in terms of sequences of actions to be performed by, for example, elements of a computing device. It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for implementing an anatomy-aware contour editing method.

The aspects of the disclosed embodiments may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

The aspects of the disclosed embodiments also relate to a computer program product as described above. Various embodiments and variants disclosed above apply mutatis mutandis to the computer program product.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A contour editing method comprising:
   detecting a selection input with respect to a medical image presented on a graphical user interface, wherein the medical image depicts an organ;
   determining and presenting a bounding box around a region of interest in the medical image based on the selection input;
   determining a contour of the organ within the bounding box;
   detecting at least one other selection input on the graphical user interface with respect to the medical image, wherein the at least one other selection input includes a single click or a single tap;
   adjusting the contour of the organ by determining if the at least one other selection input is within the contour of the organ or outside of the contour of the organ, wherein:
   (1) if the at least one other selection input is within the contour of the organ, the adjustment comprises:
      removing a portion of the medical image associated with the at least one other selection input from the contour of the organ; and
      decreasing one or more dimensions of the bounding box to exclude the portion of the medical image associated with the at least one other selection input;
   (2) if the at least one other selection input is outside of the contour of the organ, the adjustment comprises:
      adding the portion of the medical image associated with the at least one other selection input to the contour of the organ; and
      increasing one or more dimensions of the bounding box to include the portion of the medical image associated with the at least one other selection input;
   detecting another user input that indicates a movement of a point associated with the adjusted contour of the organ; and
   refining the contour of the organ based on the movement of the point.

2. The contour editing method of claim 1, wherein, if the at least one other selection input is outside of the contour of the organ, the method further comprising:
   detecting, via the graphical user interface, a selection of an area of the medical image within the contour of the organ adjusted based on the at least one other selection input;
   detecting, via the graphical user interface, a movement of the selection on the graphical user interface; and
   repositioning the selected area of the medical image based on the movement of the selection.

3. The contour editing method of claim 1, wherein determining and presenting the bounding box around the region of interest based on the detected selection input comprises:
   determining a point in the medical image that corresponds to the detected selection input;
   determining a size and a shape of the bounding box based on the point that corresponds to the detected selection input such that the bounding box includes the point; and
   displaying the bounding box as a visibly distinguishable region from other regions of the medical image.

4. The contour editing method of claim 3, wherein the bounding box has a rectangular shape and the contour of the organ has a polygonal shape or a freeform shape.

5. The contour editing method of claim 1, further comprising determining a point of the medical image that corresponds to the at least one other selection input, and highlighting the point in a first color if the point is inside the contour of the organ or highlighting the point in a second color if the point is outside of the contour of the organ.

6. The contour editing method of claim 1, wherein the medical image is a magnetic resonance imaging (MRI) image, and wherein the organ is associated with a heart.

7. The contour editing method of claim 1, wherein the bounding box is a three-dimensional bounding box.

8. The contour editing method of claim 1, wherein the at least one other selection input includes a single touch input.

9. The contour editing method of claim 1, wherein the contour of the organ has one of a circular shape, an elliptical shape, a rectangular shape, a polygonal shape, a freeform shape, a spherical shape, an ellipsoid, a cuboidal shape, a polygonal prism shape, a polygonal pyramid shape, a freeform prism shape, or a freeform pyramid shape.

10. A system comprising a hardware processor configured to render a graphical user interface, wherein the hardware processor is further configured to:
   detect a selection input with respect to a medical image presented on the graphical user interface, wherein the medical image depicts an organ;
   determine and present a bounding box around a region of interest in the medical image based on the selection input;
   determine a contour of the organ within the bounding box;
   detect at least one other selection input on the graphical user interface with respect to the medical image, wherein the at least one other selection input includes a single click or a single tap;

adjust the contour of the organ by determining if the at least one other selection input is within the contour of the organ or outside of the contour of the organ, wherein:
(1) if the at least one other selection input is within the contour of the organ, the hardware processor is configured to:
remove a portion of the medical image associated with the at least one other selection input from the contour of the organ; and
decrease one or more dimensions of the bounding box to exclude the portion of the medical image associated with the at least one other selection input;
(2) if the at least one other selection input is outside of the contour of the organ, the hardware processor is configured to:
add the portion of the medical image associated with the at least one other selection input to the contour of the organ; and
increase one or more dimensions of the bounding box to include the portion of the medical image associated with the at least one other selection input;
detect another user input that indicates a movement of a point associated with the adjusted contour of the organ; and
refine the contour of the organ based on the movement of the point.

11. The system of claim 10, wherein, if the at least one other selection input is outside of the contour of the organ, the hardware processor is further configured to:
detect, via the graphical user interface, a selection of an area of the medical image within the contour of the organ adjusted based on the at least one other selection input;
detect, via the graphical user interface, a movement of the selection on the graphical user interface; and
reposition the selected area of the medical image based on the movement of the selection.

12. The system of claim 10, wherein the hardware processor being configured to determine and present the bounding box around the region of interest based on the detected selection input comprises the hardware processor being configured to:
determine a point in the medical image that corresponds to the detected selection input;
determine a size and a shape of the bounding box based on the point that corresponds to the detected selection input such that the bounding box includes the point; and
display the bounding box as a visibly distinguishable region from other regions of the medical image.

13. The system of claim 12, wherein the bounding box has a rectangular shape and the contour of the organ has a polygonal shape or a freeform shape.

14. The system of claim 1, wherein the hardware processor is further configured to determine a point of the medical image that corresponds to the at least one other selection input, and highlight the point in a first color if the point is inside the contour of the organ or highlight the point in a second color if the point is outside of the contour of the organ.

15. The system of claim 10, wherein the medical image is a magnetic resonance imaging (MRI) image, and wherein the organ is associated with a heart.

16. The system of claim 10, wherein the bounding box is a three-dimensional bounding box.

17. The system of claim 10, wherein the at least one other selection input includes a single touch input.

18. The system of claim 10, wherein the contour of the organ has one of a circular shape, an elliptical shape, a rectangular shape, a polygonal shape, a freeform shape, a spherical shape, an ellipsoid, a cuboidal shape, a polygonal prism shape, a polygonal pyramid shape, a freeform prism shape, or a freeform pyramid shape.

* * * * *